United States Patent
Holtstiege et al.

(10) Patent No.: US 11,436,466 B2
(45) Date of Patent: *Sep. 6, 2022

(54) INSULATING GLAZING UNIT

(71) Applicant: SAINT-GOBAIN GLASS FRANCE, Courbevoie (FR)

(72) Inventors: Thomas Holtstiege, Schwelm (DE); Alicia Dröge, Aachen (DE); Christian Effertz, Aachen (DE); Christopher Marjan, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 56 days.

This patent is subject to a terminal disclaimer.

(21) Appl. No.: 17/055,772

(22) PCT Filed: May 8, 2019

(86) PCT No.: PCT/EP2019/061760
§ 371 (c)(1),
(2) Date: Nov. 16, 2020

(87) PCT Pub. No.: WO2019/219462
PCT Pub. Date: Nov. 21, 2019

(65) Prior Publication Data
US 2021/0182648 A1 Jun. 17, 2021

(30) Foreign Application Priority Data
May 14, 2018 (EP) ..................................... 18172065

(51) Int. Cl.
G06K 19/077 (2006.01)
E06B 3/12 (2006.01)
(Continued)

(52) U.S. Cl.
CPC .......... *G06K 19/07758* (2013.01); *E06B 3/12* (2013.01); *E06B 3/5409* (2013.01);
(Continued)

(58) Field of Classification Search
CPC .. E06B 3/66309; E06B 3/663; E06B 3/66314; E06B 3/6621; E06B 3/5409;
(Continued)

(56) References Cited

U.S. PATENT DOCUMENTS 2,684,266 A * 7/1954 Englehart ........... E06B 3/66314
239/34
8,384,520 B2 * 2/2013 Fourreau ................. G09F 3/203
701/14

(Continued)

FOREIGN PATENT DOCUMENTS

AT 408014 B 8/2001
AU 2014327719 A1 2/2016
(Continued)

OTHER PUBLICATIONS

International Search Report as issued in International Patent Application No. PCT/EP2019/061760, dated Jul. 12, 2019.
(Continued)

*Primary Examiner* — Christine T Cajilig
(74) *Attorney, Agent, or Firm* — Pillsbury Winthrop Shaw Pittman LLP

(57) ABSTRACT

An insulating glazing unit that has at least two glass panes and a circumferential spacer profile between them near their edges, for use in a window, a door, or a façade glazing, which has in each case a frame surrounding the edges of the insulating glazing, into which the insulating glazing is inserted using spacers, wherein at least one RFID transponder is attached to the insulating glazing unit as an identification element, wherein the a least one transponder is
(Continued)

Figure 1:
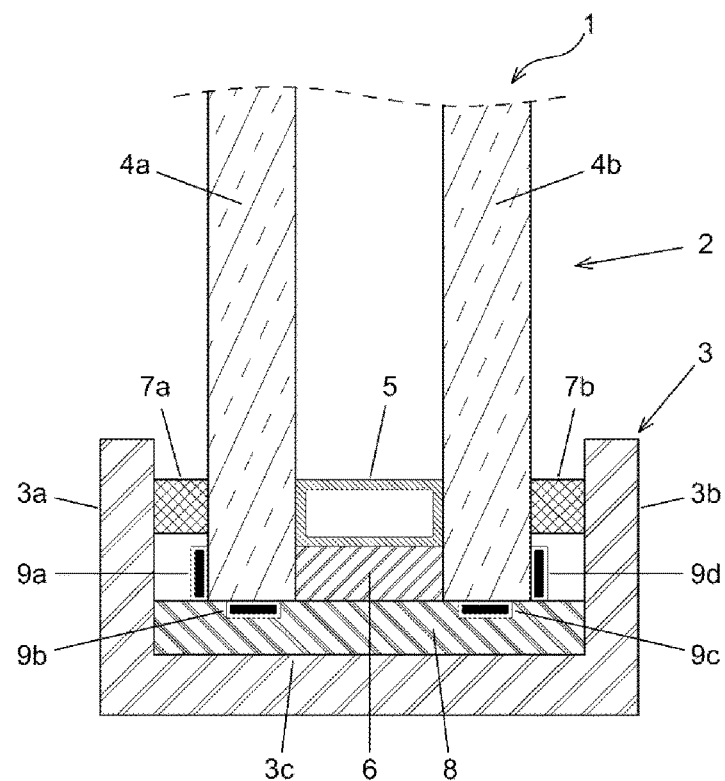

positioned at the edge or on the boundary edge of a glass pane such that, in the installed state of the window, door, or façade glazing, it is positioned on or above a spacer in the surrounding, in particular metallic, frame.

15 Claims, 3 Drawing Sheets

(51) Int. Cl.
*E06B 3/54* (2006.01)
*E06B 3/66* (2006.01)
*E06B 3/663* (2006.01)
*G06K 19/07* (2006.01)

(52) U.S. Cl.
CPC ........ *E06B 3/6621* (2013.01); *E06B 3/66314* (2013.01); *G06K 19/0723* (2013.01); *E06B 3/5454* (2013.01); *E06B 3/6612* (2013.01)

(58) Field of Classification Search
CPC ....... E04B 1/12; E04B 7/28; G06K 19/07758; G06K 19/0723; H04B 1/59; H01Q 1/1271
See application file for complete search history.

(56) References Cited

U.S. PATENT DOCUMENTS

| | | | | |
|---|---|---|---|---|
| 10,303,035 | B2* | 5/2019 | Brown | E06B 9/24 |
| 2006/0238355 | A1* | 10/2006 | Kokuryo | B29C 45/14434 340/572.8 |
| 2008/0129499 | A1* | 6/2008 | Masuzaka | G08B 13/04 340/545.1 |
| 2009/0243802 | A1* | 10/2009 | Wolf | E06B 3/66309 156/60 |
| 2011/0133940 | A1 | 6/2011 | Margalit et al. | |
| 2017/0167185 | A1* | 6/2017 | Boer | E06B 1/6061 |
| 2017/0167186 | A1* | 6/2017 | Messere | E06B 3/66314 |
| 2020/0082240 | A1* | 3/2020 | Heitmar | E06B 7/28 |
| 2020/0193259 | A1 | 6/2020 | Thangamani et al. | |

FOREIGN PATENT DOCUMENTS

| | | | | |
|---|---|---|---|---|
| CN | 103649826 | A | 3/2014 | |
| EP | 1 353 020 | B1 | 6/2008 | |
| EP | 2 719 533 | A1 | 4/2014 | |
| EP | 3 287 998 | A1 | 2/2018 | |
| EP | 3287998 | A1 * | 2/2018 | ........... E06B 3/6612 |
| FR | 2 787 134 | A1 | 6/2000 | |
| FR | 2 787 135 | A1 | 6/2000 | |
| FR | 2787135 | A1 * | 6/2000 | ....... B32B 17/10036 |
| FR | 2 928 763 | A1 | 9/2009 | |
| JP | 2010-224968 | A | 10/2010 | |
| WO | WO 00/36261 | A1 | 6/2000 | |
| WO | WO-0036261 | A1 * | 6/2000 | ....... B32B 17/10036 |
| WO | WO 2007/137719 | A1 | 12/2007 | |
| WO | WO 2019/219460 | A1 | 11/2019 | |
| WO | WO 2019/219462 | A1 | 11/2019 | |

OTHER PUBLICATIONS

Notice of Allowance as issued in U.S. Appl. No. 17/055,793, dated May 26, 2022.
Notice of Allowance as issued in U.S. Appl. No. 16/978,933, dated Jun. 2, 2022.
Non-Final Office Action as issued in U.S. Appl. No. 17/055,793, dated Feb. 1, 2022.
Non-Final Office Action as issued in U.S. Appl. No. 16/978,933, dated Feb. 16, 2022.
First Office Action as issued in Chinese Patent Application No. 2019800322218, dated Dec. 21, 2021.
Examination Report as issued in Indian Patent Application No. 202017048110, dated Jan. 3, 2022.
Examination Report as issued in Canadian Patent Application No. 3,099,088, dated Jan. 26, 2022.

* cited by examiner

INSULATING GLAZING UNIT

CROSS-REFERENCE TO RELATED APPLICATIONS

This application is the U.S. National Stage of PCT/EP2019/061760, filed May 8, 2019, which in turn claims priority to European patent application number filed 18172065.7 filed May 14, 2018. The content of these applications are incorporated herein by reference in their entireties.

The invention relates to an insulating glazing unit that has at least two glass panes and a circumferential spacer profile between them near their edges for use in a window, a door, or a façade glazing, which has, in each case, a frame surrounding the edges of the insulating glazing, wherein at least one RFID transponder is attached to the insulating glazing unit as an identification element. It further relates to a window, a door, and a façade glazing, formed with such an insulating glazing unit.

Modern windows, doors, and façade glazings, at least for use in northern and temperate latitudes, are usually produced using prefabricated insulating glazing units that have the aforementioned structure, but, optionally, can include even more than two glass panes in the combination. Such insulating glazing units are mass-produced, shipped, and also independently marketed products that should be clearly identifiable on their way to an end product and possibly even during maintenance and servicing.

It is already known to provide insulating glazing units with such identifying markings and certain requirements of manufacturers and users have arisen in the related practice.

[1] The identifying marking should not be visible either from the inside or from the outside.

[2] The marking should be "readable" from a distance between 30 cm and 1 m.

[3] The marking should be as forgery-proof as possible, i.e., it should not be readily possible to overwrite or to copy it.

The effectiveness of conventional identifying markings, such as barcodes or QR codes, is based on their visibility, which means at least one restriction under the above aspect [1]. Meeting the requirement [2] is also difficult therewith.

It has also been proposed to provide insulating glazing units with "electronic" identifiers, in particular via radio readable identifiers, so-called "RFID (radio-frequency identification) transponders". Such insulating glazing units are, for example, disclosed in WO 00/36261 A1 or WO 2007/137719 A1.

Certain types of window and door frames, but especially façade constructions in which insulating glazing units are installed are made entirely or at least partially of a metal (aluminum, steel . . . ), which interrupts or at least greatly attenuates the passage of radio waves from or to the RFID transponder on the insulating glazing unit. For this reason, meeting the above requirement [2] has, in particular, proved difficult. Known insulating glazing units provided with RFID transponders are, consequently, not readily usable with metallic frame constructions. This reduces the potential range of application of glazing units identified in this manner and thus the acceptance of these marking solutions by manufacturers and users.

The object of the invention is, consequently, to provide an improved insulating glazing unit of the aforementioned type that is, in particular, not problematic for use even in frame constructions made at least to a considerable extent of a metal and that also ensures meeting the aforementioned requirements in such installation situations.

This object is accomplished by an insulating glazing unit with the features of claim 1, i.e., by the fact that the transponder or at least one transponder is positioned on an outer surface of one of the glass panes at its edge or on the boundary edge of a glass pane such that, in the installed state of the window, the door, or the façade glazing, it is positioned in the surrounding, in particular metallic, frame. Expedient further developments of the idea of the invention are the subject matter of the dependent claims.

The invention is a result of extensive experimental investigations undertaken on insulating glazing units with the aforementioned basic structure, wherein, in particular, the spacer is a desiccant-filled hollow profile that is made of metal or is coated at least in sections with a metal foil, and wherein a (likewise circumferential) sealant strip is applied on the pane outer surface of the spacer profile. With regard to the application situation, the inventors carried out, in particular, investigations on insulating glazing units embedded in metallic frames, wherein spacers are positioned at intervals on the rebate base of the frame and elastomer sealing strips are arranged between the outer sides of the glass pane and the inner side of the adjacent upright frame rebates. Commercially available RFID transponders, whose structure and functionality are well known and, consequently, need not be further described here, were used in the investigations. The radio wavelengths used in such transponder systems are usually in the range between 125 kHz and 960 MHz (rarely between 2.45 GHz and 5.8 GHz) and penetrate both wood and conventional plastics but not metals. The findings of the inventors apply in principle to both passive and active RFID transponders.

With regard to metal frames that surround an insulating glazing unit and that, based on elementary laws of physics and according to the knowledge of the person skilled in the art based thereon, should sensitively interfere with, if not completely suppress, the HF radiation of RFID transponders placed near the edge or their antennas, the proposed solution is surprising. It yields the unforeseen advantage that an RFID transponder placed according to the invention can still be read out without problems and reliably at a relatively large distance of 0.5 to 1 m from a window, a door, or a façade glazing in which the insulating glazing unit is installed.

In expedient embodiments of the invention, at least one transponder is placed at a corner of the insulating glazing unit. In one embodiment, it is arranged at a predetermined corner, which is specified based on a predetermined installation position of the insulating glazing unit in the frame. This embodiment enables quickly identifying an installed insulating glazing unit, without having to search all corners as to whether the transponder delivering the identification is placed there or elsewhere. In addition, the corner has an amplifying effect on the signal such that the signal can be read even from greater distances compared to otherwise positioned transponders.

Arrangement of transponder "at a corner" of the insulating glazing unit means that the end of the transponder pointed toward the nearest corner of the insulating glazing unit is not more than 30 cm, preferably not more than 20 cm, particularly preferably not more than 10 cm, most particularly preferably not more than 5 cm away from this corner of the insulating glazing unit.

In another embodiment, provision is made to arrange a transponder at each corner of the insulating glazing unit. This embodiment is somewhat more complicated to manufacture than the aforementioned and enables, as a result, quick identification of every insulating glazing unit so equipped regardless of whether specifications had been made for a prescribed installation position and whether these are actually complied with.

Especially in combination with the aforementioned embodiment, another embodiment is advantageous wherein the RFID transponder is electromagnetically or electrically coupled or connected to a conductive spacer profile or a conductive section of a spacer profile such that the radiation and reception properties of the entire system (transponder-insulating glazing unit-spacer profile-frame) are improved. In this embodiment, for example, the conductive spacer profile or the conductive section of a spacer profile acts as an antenna of the transponder.

In another alternative embodiment, the or each transponder is applied on an outer surface of one of the glass panes at its edge.

In a manner particularly desirable aesthetically, the transponder is dimensioned and placed at the edge such that, in the installed state of the window, the door, or the façade glazing, it is completely covered by an upright rebate wall of the surrounding, in particular metallic, frame.

In other embodiments of the invention, provision is made to apply an indicating mark visible to the naked eye on at least one outer glass pane at the location of the transponder.

In another embodiment, the insulating glazing unit is already prefabricated with spacers positioned according to the invention relative to the transponder(s).

The invention further relates to a window, a door, and a façade glazing that are formed with an insulating glazing unit according to the invention.

Figure 2:
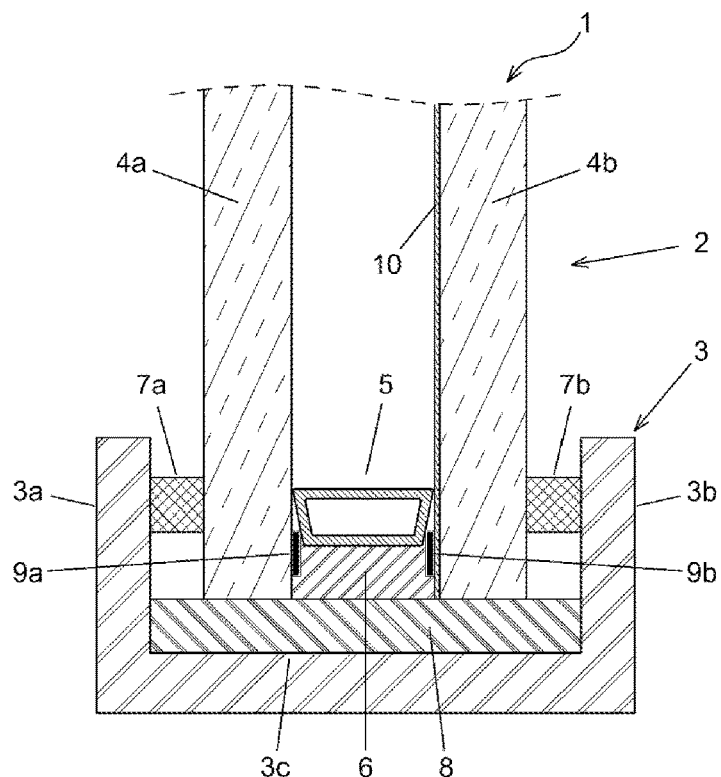
Figure 3:
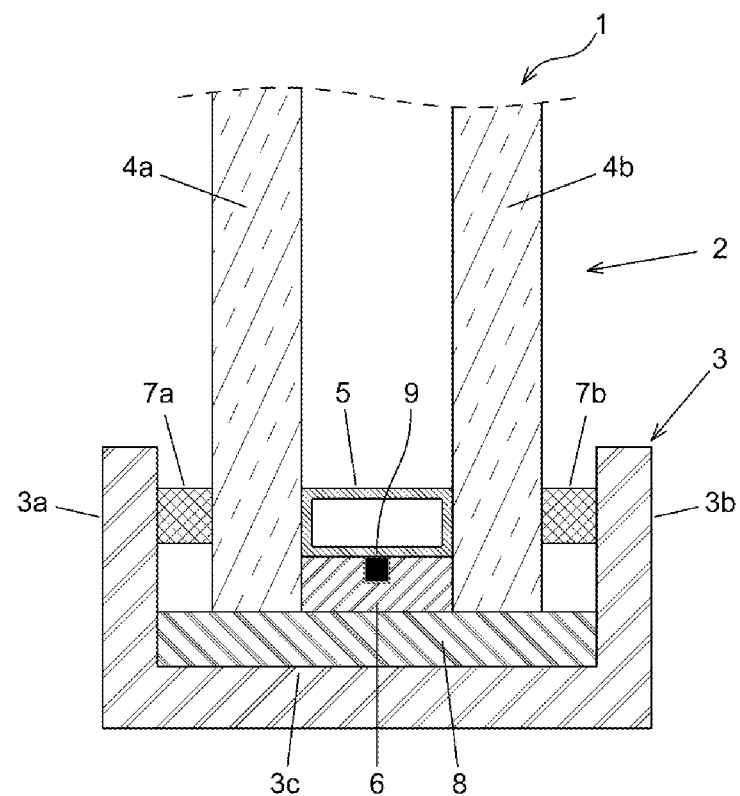
Figure 4:
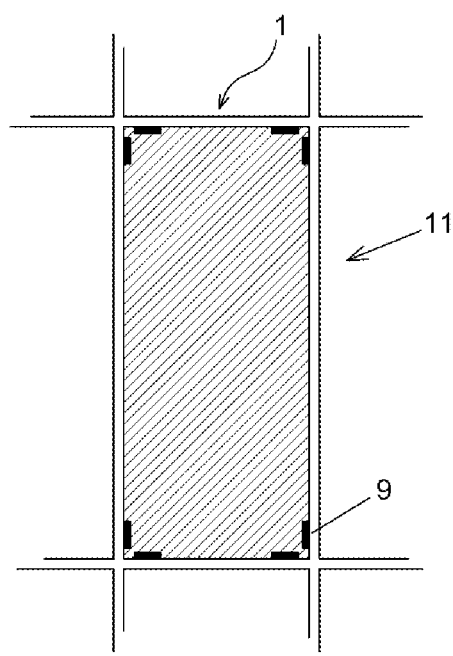
Figure 5:
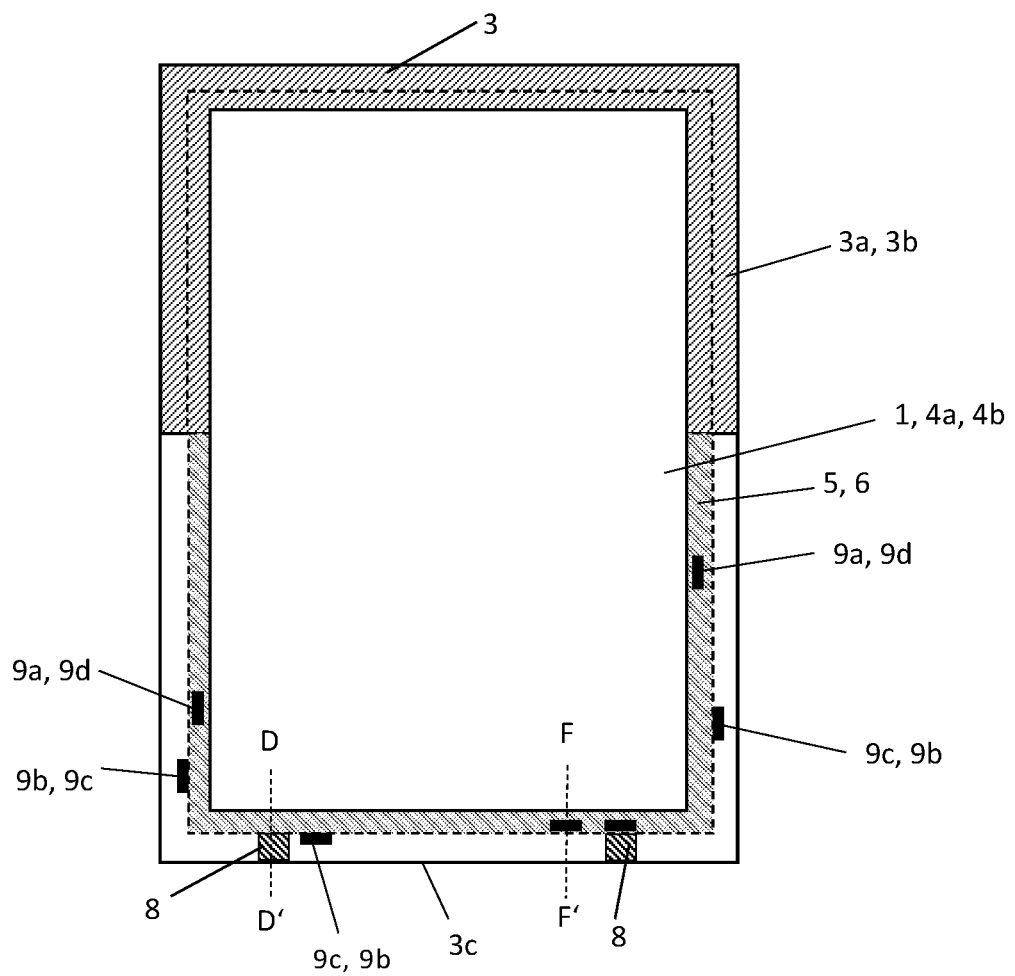

Advantages and functionalities of the invention are also evident from the following description of exemplary embodiments with reference to the figures. They depict:

FIG. 1 a detailed view (cross-sectional representation) of an edge region of a window in which an insulating glazing unit is installed in accordance with an embodiment of the invention, FIG. 2 a detailed view (cross-sectional representation) of an edge region of a window in which an insulating glazing unit is installed in accordance with another embodiment of the invention, FIG. 3 a detailed view (cross-sectional representation) of an edge region of a window in which an insulating glazing unit is installed in accordance with another embodiment of the invention, FIG. 4 a schematic representation (plan view) of a section of a façade glazing in which an insulating glazing unit according to the invention is installed, and FIG. 5 a schematic representation (plan view/cut) of a section of a façade glazing, in which an insulating glazing unit according to the invention is installed.

In the figures as well as the following description, the insulating glazing units as well as the window and the individual components are in each case identified with the same reference characters regardless of the fact that the specific embodiments differ.

FIG. 1 depicts an edge region of an insulating glazing unit 1, inserted into a metal frame 3 substantially U-shaped in cross-section and surrounding the end face of the insulating glazing unit as parts of an insulating window 2.

In this embodiment, the insulating glazing unit 1 comprises two glass panes 4a and 4b that are held apart at a predetermined distance by a spacer profile 5 placed between the glass panes near the end face. The spacer profile 5 is usually hollow and filled with a desiccant (not shown) that, via small openings (also not shown) on the inside, binds any moisture that has penetrated into the interpane space. The interpane space between the glass panes 4a and 4b is evacuated or filled with a noble gas, such as argon. An elastomer seal (sealing profile) 6 is introduced in the edge region of the insulating glazing unit 1, between the glass panes 4a and 4b and outside the spacer profile 5.

In the embodiment depicted in FIG. 1, the respective intermediate space between the two upright rebate walls 3a, 3b of the frame 3 and the adjacent glass pane 4a or 4b is also sealed with an elastomer profile 7a or 7b. In the rebate base 3c of the frame 3, spacers 8 are positioned at specified points of the longitudinal extension of the frame, which spacers preferably extend substantially over the complete width of the rebate base 3c and thus completely support the end face of the insulating glazing unit 1 in a point-wise manner. Such spacers are usually manufactured from a plastic that is firm but not brittle up to certain extent and is also flexible at points.

The insulating glazing unit 1 of FIG. 1 is, by way of example, provided with a total of four RFID transponders 9a to 9d. Of these, the transponders 9a and 9d are applied at the edge of the glass pane 4a or 4b on their outer surface, in each case, whereas the transponders 9b and 9c are applied on the boundary edge of the glass panes 4a and 4b respectively. This exemplary arrangement serves to illustrate the mounting possibilities of the transponders with an insulating glazing unit in accordance with a first embodiment of the invention; in practice, normally only one or two of the possible mounting positions shown here will be occupied. When mounted on the pane surface, the or each transponder can also be at some distance from the edge.

FIG. 2 depicts a modified construction in which the glass pane 4b has an interior-side coating (possibly a thermal protection coating) 10 that can cover the glass completely or only partially.

In the case of this embodiment, two transponders 9a, 9b are depicted, applied in each case on the interior-side surfaces of the glass panes 4a or 4b, and, in fact, in the edge region between the spacer profile 5 and the sealing profile 6 sealing the insulating glazing unit. Since the spacer profile 5 is, in this embodiment, trapezoidal in cross-section, i.e., somewhat tapered toward the end edge of the insulating glazing unit, there is, at that location, a small gap relative to the adjacent glass surface into which commercially available transponders can be partially inserted. Here again, in practice, only one of the two mounting positions will normally be occupied by a transponder.

FIG. 3 depicts a slight modification of the window structure shown in FIG. 2 and described above, whose only difference is the provision of a single RFID transponder 9 and its positioning centrally between the glass panes 4a and 4b at the outer surface of the spacer profile 5, embedded in the adjacent surface of the sealing profile 6.

FIG. 4 depicts schematically, using the example of a façade glazing 10, the attachment of transponders 9 in the corner regions of an insulating glazing unit 1. Investigations by the inventors showed that such an arrangement has a positive effect on the reception/transmission characteristics and increases the achievable reading distance of the transponders. As depicted in the figure, transponders with an elongated housing can be attached in the vicinity of the corners both on the long and the short sides of the insulating glazing unit, and, in fact, in principle in any of the ways shown in FIGS. 1 to 3 and described above.

FIG. 5 schematically depicts a plan view of a façade glazing or the insulating glazing installed therein. In the upper part of the drawing, the metallic frame 3 is visible such that, viewed from above, one sees one of the two upright rebate walls 3a or 3b. In the lower part of the drawing, the frame is not shown, for reasons of illustration, such that the arrangement of the insulating glazing unit in the frame is visible. In the drawing, spacers 8 are positioned on a short side of the frame (bottom) inside the frame. The spacers 8 are positioned at specified points on the rebate base in order to support the insulating glazing unit in the frame at certain points. Spacers can be mounted along one side (as shown in the drawing), along two sides, three sides, or all four sides as needed. The representation shown in FIG. 1 corresponds, except for the positions of the transponders, to a cross-section at a point with a spacer, i.e., to a section along the line D-D'. A section along the line F-F' is not depicted in FIGS. 1 to 3, but would appear accordingly, possibly with no spacer visible or with a spacer positioned farther back that might be visible in the background.

FIG. 5 indicates various positions for the RFID transponders 9a-9d. The RFID transponders 9b, 9c are positioned on the boundary edge of a glass pane, as also depicted in FIG. 1. The boundary edge is the circumferential side edge of a glass pane. Preferably, the RFID transponder 9b, 9c is arranged in a region in which there is no spacer, for example, between two spacers. Crushing or squeezing between the spacer and the insulating glazing unit is thus prevented. Alternatively, arrangement next to the spacer is also possible. In that case, the transponder is protected by the spacer. The RFID transponders are positioned inside the metallic frame 3 and are hidden by it.

The RFID transponders 9a, 9d are positioned on the outer surface of one of the glass panes 4a, 4b at its edge, as also depicted in FIG. 1. The RFID transponders 9a, 9d are, accordingly, arranged on the glass panes in the region of the edge seal made up of the spacer profile 5 and the sealing profile 6 of the insulating glazing unit. Thus, they are hidden by the metallic frame. The RFID transponders can be arranged completely or partially above a spacer (in the region of the line D-D') or next to or between the spacers.

The embodiment of the invention is not restricted to the above-described examples and highlighted aspects of the embodiments, but is also possible in a large number of modifications that are evident to the person skilled in the art from the dependent claims.

LIST OF REFERENCE CHARACTERS 1 insulating glazing unit
2 window
3 frame
3a, 3b upright rebate walls
3c rebate base
4a, 4b glass panes
5 spacer profile
6 sealing profile of the insulating glazing unit
7a, 7b elastomer profile on the frame
8 spacer
9, 9a-9d RFID transponder
10 façade glazing

The invention claimed is:

1. An insulating glazing unit that comprises at least two glass panes and a circumferential spacer profile between the at least two glass panes near edges of the at least two glass panes, for use in a window, a door, or a façade glazing, which has in each case a frame, surrounding the edges of the insulating glazing with upright rebate walls, into which the insulating glazing is inserted using spacers, wherein at least one RFID transponder is attached to the insulating glazing unit as an identification element, and wherein the at least one RFID transponder is positioned on an outer surface of one of the at least two glass panes at its edge or on a boundary edge of a glass pane such that, in an installed state of the window, the door, or the façade glazing, the at least one RFID transponder is positioned in the surrounding frame, wherein the at least one RFID transponder is electromagnetically or electrically coupled or connected to a conductive spacer profile or to a conductive section of a spacer profile such that radiation and reception properties of the entire system (transponder-insulating glazing unit-spacer profile-frame) are improved.

2. The insulating glazing unit according to claim 1, wherein the at least one RFID transponder is arranged such that, in the installed state, the at least one RFID transponder is positioned at a location at which no spacer is arranged.

3. The insulating glazing unit according to claim 1, wherein the at least one RFID transponder is positioned such that, in the installed state, the at least one RFID transponder is positioned completely or partially on or above a spacer.

4. The insulating glazing unit according to claim 1, wherein the at least one RFID transponder is positioned such that, in the installed state, the at least one RFID transponder is positioned in an intermediate space between one of the upright rebate walls and an adjacent glass pane of the at least two glass panes.

5. The insulating glazing unit according to claim 4, wherein the intermediate space between the upright rebate walls of the frame and the respective adjacent glass pane is sealed with an elastomer profile and the at least one RFID transponder is arranged in the sealed intermediate space.

6. The insulating glazing unit according to claim 1, wherein at a location of the at least one RFID transponder an indicating mark visible to the naked eye is applied on at least one glass pane of the at least two glass panes.

7. The insulating glazing unit according to claim 1, wherein the at least one RFID transponder is dimensioned and placed at the edge such that, in the installed state of the window, the door, or the façade glazing, the at least one RFID transponder is completely covered by one of the upright rebate walls of the surrounding frame.

8. The insulating glazing unit according to claim 1, with spacers glued onto at least one end face.

9. The insulating glazing unit according to claim 1, wherein the least one RFID transponder is arranged at a corner of the insulating glazing unit.

10. The insulating glazing unit according to claim 1, wherein the at least one RFID transponder is arranged at a predetermined corner, which is specified based on a predetermined installation position of the insulating glazing unit in the frame.

11. A window comprising the frame and the insulating glazing unit according to claim 1, the insulating glazing unit being inserted into the frame.

12. A door comprising the frame and the insulating glazing unit according to claim 1, the insulating glazing unit being inserted into the frame.

13. A façade glazing with a construction that comprises the frame and the insulating glazing unit according to claim 1, the insulating glazing unit being inserted into the frame.

14. The insulating glazing unit according to claim 1, wherein the frame is a metallic frame.

15. The insulating glazing unit according to claim 7, wherein the frame is a metallic frame.

* * * * *